Patented July 11, 1939

2,165,428

UNITED STATES PATENT OFFICE 2,165,428

CATALYSTS FOR PRODUCING ALIPHATIC ACIDS AND PROCESS FOR PRODUCING THEM

George P. Waugh, Rochester, N. Y., assignor to Eastman Kodak Company, Rochester, N. Y., a corporation of New Jersey No Drawing. Application September 22, 1936, Serial No. 101,988

6 Claims. (Cl. 23—234)

This invention relates to the manufacture of aliphatic acids from alcohols, aldehydes and water, and more particularly to a process for producing acetic acid from ethyl alcohol, acetaldehyde and water, by reaction in the presence of a catalyst.

The economic production of aliphatic acids is a problem of considerable commercial importance. Large amounts of acetic acid and other aliphatic acids are consumed in the manufacture of cellulose esters and other cellulosic compounds, and in the manufacture of numerous other chemical materials. At present, a large amount of these acids is produced from the destructive distillation of wood, although propionic and butyric acids are also produced synthetically and by fermentation. Therefore, the development of a simple and inexpensive method for manufacturing aliphatic acids and in particular acetic acid from a readily available source of material is a desirable result.

In present-day industry large amounts of aqueous alcohol are being produced, of a quality unsuitable, because of the water content, for some of the well-established usages. I have found a method and catalyst whereby aqueous alcohols may be converted to aliphatic acids.

I have developed a new process for converting aqueous alcohol from commercial sources, or alcohol from other sources mixed with varying amounts of aldehyde, water and other components into aliphatic acids; together with novel catalysts and related means for accomplishing the following objects:

This invention has as an object to provide a process for producing aliphatic acids from aqueous solutions containing the corresponding alcohols, aldehydes and other components. Another object is to provide a continuous process for converting aqueous solutions of ethyl alcohol and acetaldehyde into acetic acid. A still further object is to provide a process particularly adapted for the conversion of aqueous ethyl alcohol solutions to acetic acid. Still another object is to provide a process for converting ethyl alcohol, propyl alcohol or butyl alcohol or their aldehydes to the corresponding acids.

Another object is to provide a new catalyst particularly suitable for use in the conversion of aqueous alcohol and aldehyde solutions to aliphatic acids. Another object is to provide a method for the production of this catalyst. Other objects will appear hereinafter.

After considerable investigation, I have found that it is possible to produce substantial quantities of aliphatic acids from water, alcohols and aldehydes, providing the reaction is carried out in the presence of my novel catalyst and under the proper operating conditions. For example, in the case of aqueous ethyl alcohol solutions containing more or less acetaldehyde, these components may be readily converted to acetic acid by catalytic reaction in the presence of my novel catalysts which will be described in detail hereinafter.

For further details concerning my new processes and for more complete understanding of my invention, reference is made to the following examples. In carrying out processes in accordance with the following examples, apparatus as described in W. O. Kenyon copending application Serial No. 101,985 is quite satisfactory.

It has already been indicated that the type of catalyst employed in my process is of particular importance. Catalysts which give very satisfactory results may be prepared as follows:

Example I

A heavy paste was made by thoroughly mixing:

| | | |
|---|---|---|
| Cupric oxide (powdered) | gm | 377.7 |
| Zinc oxide (powdered) | gm | 44.4 |
| Manganese dioxide (powdered) | gm | 22.2 |
| Water | cc | 258.0 |
| Sodium silicate solution (heavy commercial) | gm | 258.0 |
| Corn starch | gm | 272.0 |

The above mixture was dried, broken into chunks and reduced with hydrogen at about 320° C., reoxidized with oxygen at the same temperature, again reduced with hydrogen, oxidized and reduced again. This was broken up and the material which would pass through a 6 mesh screen but not a 20 mesh was used.

100 gm. of this catalyst were placed in a catalyst tube which was heated in a salt bath at 320° C., and a mixture of ethanol:water in the molecular proportions of about 1:3 was run through at the rate of about 1 cc. per minute. A 90 minute run, after a preliminary run of 30 minutes, showed a substantial conversion to acetic acid.

Example II 255 gm. copper oxide, 30 gm. zinc oxide, and 15 gm. manganese oxide were mixed with enough of an 8 to 1 acetone dope of cellulose acetate to make a stiff paste. After drying, this mass was heated in an open dish. The cellulose acetate burned off readily, leaving the copper oxide partly reduced. The material was alternately oxidized, reduced, oxidized, and reduced at 320° C.

The reduced material was broken and sifted so that it would pass a 6 mesh sieve but not one of 20 mesh. 100 gm. of this catalyst were placed in the catalyst tube, and alcohol:water in a molar ratio of about 1:3 was passed through at the rate of about 1 cc. per minute, while maintaining the catalyst tube at approximately 320° C. as in Example I. Substantial yields of acetic acid per pass were obtained.

The overall yield of aliphatic acid may be increased by re-circulation, pre-heating and a number of other expedients. Also apparatus similar to that shown in U. S. Patent 1,124,347 may be employed.

My catalyst may be prepared from simple and inexpensive materials which are readily obtainable and which yield a catalyst that stands up satisfactorily under various conditions. My catalyst, when prepared under the conditions, as already outlined, including mixing the components with pasty-like materials, yields a product which appears to be porous throughout. Hence, upon subsequent oxidations and reductions, the catalyst may be apparently completely reduced, at least probably as to the copper oxide content and may be distinguished by a porous appearance throughout rather than just presenting a surface porosity.

My catalyst may contain aluminum, boron, calcium, sodium and silicon. Certain of these elements may be introduced from the materials used in the catalyst preparation.

My invention is not to be limited to the examples shown as my process may be applied to components other than ethyl alcohol, such as propyl and butyl alcohol or aldehydes.

While a feed ratio of 1:3 (molar ratio) is satisfactory this may be varied from 1:1 to 1:6 for example. Likewise the temperature may be varied from 250–450° C. The process is preferably operated under about atmospheric or a slight external pressure to cause the passage of the material through the system. My process may be carried out under higher pressure or reduced pressure may be applied to the exit end of the equipment in order to cause the materials to pass therethrough.

It is therefore apparent while I have described my invention in some detail, there are many changes which may be made therein without departing from the spirit thereof. Hence, I do not wish to be limited excepting insofar as is necessitated by the prior art and the spirit of the appended claims.

What I claim and desire to secure by Letters Patent of the United States is:

1. A process for the preparation of an acetic acid catalyst which comprises preparing a mixture containing small amounts of oxides of zinc and manganese, larger amounts of oxides of copper and pasty binder, and oxidizing and reducing the mixture.

2. A catalyst comprised principally of copper with smaller quantities of manganese and zinc the catalyst being obtained from an alternately reduced and oxidized mixture of the oxides of these metals with a pasty binder.

3. A catalyst for use in converting aqueous alcohol solutions to aliphatic acids, which comprises the reoxidation and reduction product of a mixture containing cupric oxide, zinc oxide, manganese dioxide, water, sodium silicate and cornstarch.

4. A catalyst for use in converting aqueous alcohol to aliphatic acid, which comprises the reoxidation and reduction product of a mixture containing copper oxide, zinc oxide, manganese oxide and cellulose ester dope.

5. A process for preparing catalysts for use in converting aqueous alcohol into aliphatic acid, which comprises preparing a mixture including copper, zinc and manganese and a pasty binder, reducing the dried mixture at a temperature greater than 300° C., subjecting the reduced materials to re-oxidation and reduction, and sizing the materials to 6–20 mesh.

6. A process for the production of a catalyst for use in conversion of aliphatic alcohols and aldehydes to aliphatic acids which comprises preparing a mixture containing oxides of copper, zinc and manganese together with a cellulose acetate solution subjecting the mixture to treatment wherein cellulose acetate is burned off, and alternately oxidizing and reducing the remaining materials.

GEORGE P. WAUGH.